(12) United States Patent
Williams

(10) Patent No.: US 11,543,202 B1
(45) Date of Patent: Jan. 3, 2023

(54) TRACKER FOR FIREARM

(71) Applicant: Andrew C. Williams, Austin, TX (US)

(72) Inventor: Andrew C. Williams, Austin, TX (US)

( * ) Notice: Subject to any disclaimer, the term of this patent is extended or adjusted under 35 U.S.C. 154(b) by 28 days.

(21) Appl. No.: 17/125,019

(22) Filed: Dec. 17, 2020

Related U.S. Application Data

(60) Provisional application No. 62/948,867, filed on Dec. 17, 2019.

(51) Int. Cl.
*F41A 17/06* (2006.01)
*G08B 25/10* (2006.01)

(52) U.S. Cl.
CPC ............ *F41A 17/063* (2013.01); *G08B 25/10* (2013.01)

(58) Field of Classification Search
CPC .............................. F41A 17/063; G08B 25/10
USPC ......................................................... 42/70.01
See application file for complete search history.

(56) References Cited

U.S. PATENT DOCUMENTS

| | | | |
|---|---|---|---|
| 8,726,556 B1 * | 5/2014 | Willingham | F41A 17/063 42/70.11 |
| 9,523,557 B2 | 12/2016 | Sharron et al. | |
| 9,523,558 B2 | 12/2016 | Visinski et al. | |
| 9,591,255 B2 | 3/2017 | Sakiewicz et al. | |
| 10,030,940 B2 | 7/2018 | Sheets, Jr. | |
| 10,101,127 B2 | 10/2018 | Visinski et al. | |
| 10,190,838 B2 | 1/2019 | Pittman | |
| 10,197,358 B2 | 2/2019 | Hebden et al. | |
| 10,359,258 B2 | 7/2019 | Geissele | |
| 10,810,846 B1 * | 10/2020 | Gonzalez | G08B 13/149 |
| 11,156,420 B1 * | 10/2021 | Clark | F41C 23/16 |
| 2011/0079170 A1 * | 4/2011 | Al-Mutairi | E05G 1/10 340/568.1 |
| 2013/0298807 A1 * | 11/2013 | Wall | E05G 1/024 109/23 |
| 2018/0010884 A1 * | 1/2018 | Bernkrant | F41C 33/0272 |
| 2019/0137215 A1 * | 5/2019 | Bernkrant | F41C 33/029 |
| 2019/0186868 A1 * | 6/2019 | Cordero Pardo | F41C 33/029 |
| 2019/0340856 A1 * | 11/2019 | Gilbert | E05B 47/0012 |
| 2021/0389069 A1 * | 12/2021 | Koplin | A61B 5/024 |
| 2022/0051535 A1 * | 2/2022 | Siner, Jr. | G08B 13/19682 |

\* cited by examiner

*Primary Examiner* — Samir Abdosh
(74) *Attorney, Agent, or Firm* — Cramer Patent & Design, PLLC; Aaron R. Cramer

(57) ABSTRACT

A tracker for a firearm comprises a device capable of being secured to a Picatinny® rail of a firearm. The device is in wireless communication with a smart electronic device thereby alerting a user of when the firearm has been moved. The device also comes with an audio alert which issues forth a high decibel and painful sound to dissuade unauthorized use.

18 Claims, 4 Drawing Sheets

TRACKER FOR FIREARM

RELATED APPLICATIONS

The present invention was first described in and claims the benefit of U.S. Provisional Patent Application No. 62/948,867 filed on Dec. 17, 2019, the entire disclosures of which are incorporated herein by reference.

FIELD OF THE INVENTION

The present invention relates generally to a tracker and more specifically to a tracker for a firearm.

BACKGROUND OF THE INVENTION

Homeowners, shopkeepers or anyone who values personal safety can carry or have in their possession a weapon, such as a firearm. This right is bestowed upon Americans due to the addition of the 2nd Amendment to the U.S. Constitution. Such firearms can be used in sport, competition, or personal safety. Some jurisdictions enable those who own such weapons to right to carry them on their person, either concealed or visible to the public. However, due to obvious hazardous situations, personal comfort level, or local law regulations, firearms may necessarily be remote from the owner.

In times like these, a common occurrence is to store or stow the firearms in a case, safe, or other location, often times under lock and key. Some of these locations may not be so secure. In all of these instances, it behooves the owner to restrict or deny access to the firearms to anyone but themselves. Unfortunately, there are many instances when the firearm is accessible and capable of being handled by an unauthorized user. Such times are an inquisitive child or adult or during a burglary. Therefore, it is a great benefit to firearm owners to identify when such unauthorized handling of the firearm is occurring. The Tracker for Firearm fulfills this need in a manner which is easy, efficacious and cost effective.

SUMMARY OF THE INVENTION

To achieve the above and other objectives, the present invention provides for a firearm tracker which has a planar portion which has a length generally equal to a length of a picatinny rail of a firearm, a first side portion which is upstanding away from a first side of the planar portion, a second side portion which is upstanding from a second side of the planar portion and a hub which is adapted to be installed in a structure containing the firearm with an installed firearm tracker. The hub includes a second microprocessor, a second wireless transmitter, a hub visual indicator, and an audible alarm. The firearm tracker also has a personal electronic device which his adapted to be possessed by an authorized user, a device audible alarm which emits a first distress signal to the hub when an unauthorized user is in possession of the firearm, a battery which is disposed within an upper of the planar portion, a first microprocessor, at least one motion sensor, a first wireless transmitter, and an amplifier in electrical communication with the battery and a speaker which is disposed on a bottom of the planar portion and is aligned with the amplifier. The personal electronic device is in electrical communication with the hub. The battery is covered by a battery door.

The first side portion and the second side portion both may have tapering upper terminal ends to act as a grip to enable installation and removal of the firearm tracker on the picatinny rail. The hub may be adapted to be a storage compartment for the firearm. The second wireless transmitter may transmit the second distress signal to the personal electronic device adapted to be carried by the authorized user. Upon receipt of the second distress signal, the personal electronic device may emit a user audible alarm and/or an alert. Upon receipt of the first distress signal by the second wireless transmitter, the second microprocessor may activate a hub visual indicator, activate the hub audible alarm, and may generate a second distress signal.

The battery door may be flush with an upper surface of the planar portion. Along one side of the battery door is a groove to enable removal of the battery door and replacement of the battery. Electrical power may be provided by the battery feeds into the first microprocessor. The first microprocessor, the at least one motion sensor, the first wireless transmitter, and the amplifier may be disposed within the firearm tracker. The first microprocessor may be a single board computer selected from the group consisting of an Arduino®, a Raspberry Pi®, or a stamp control module. A plurality of input signals may be provided by the at least one motion sensor. The input signals may be provided by at least one touch sensor. The at least one touch sensor may be a capacitive touch sensor.

The input signals and the output signals may be provided to the first wireless transmitter and an output signal may be provided to the amplifier which produces the audible alert as heard by the speaker. The firearm tracker may be attached to the picatinny rail of the firearm. The firearm tracker may be sized to have an overall width slightly larger than an overall width of a barrel of the firearm. The firearm tracker may track unauthorized use of the firearm. The firearm may be a weapon which is selected from the group consisting of an automatic weapon, a semi-automatic weapon, a gun, or a rifle. The firearm tracker may be made of plastic.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
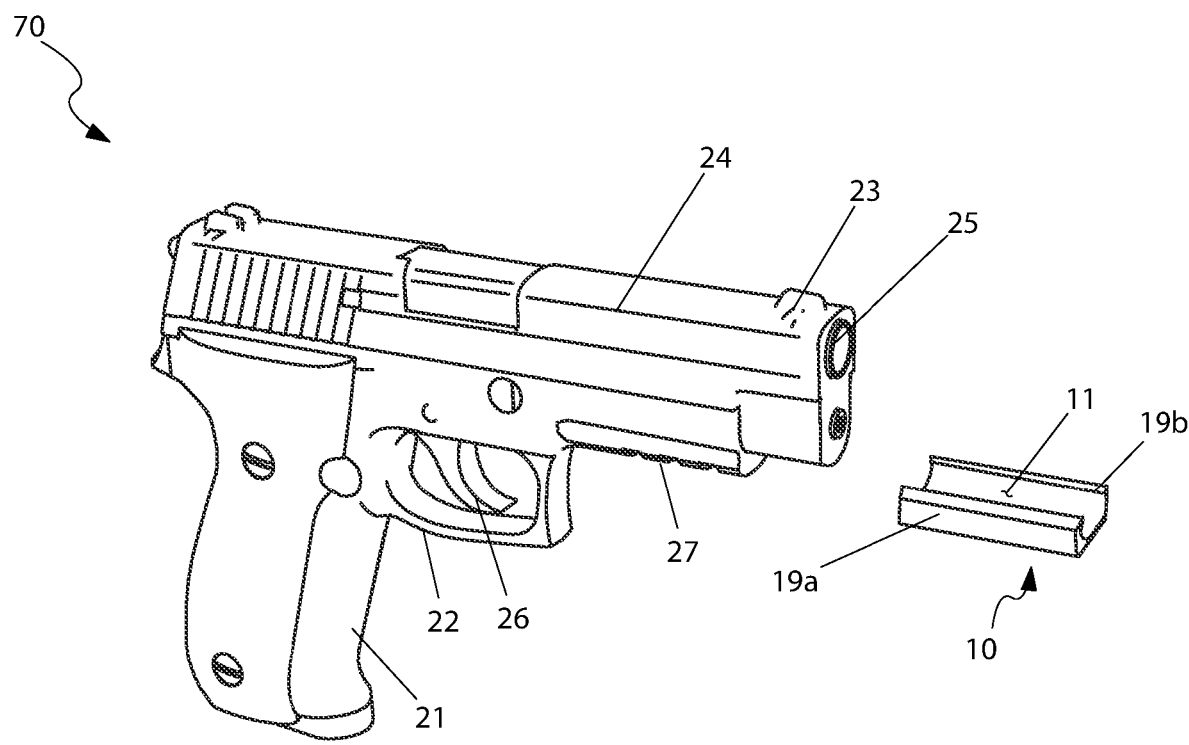
FIG. 1 is an environmental side perspective view of the tracker prior to installation on a firearm, according to the preferred embodiment of the present invention.

10 tracker
11 planar portion 12 device audible alarm
13 groove
14 battery door
15 battery
17 speaker
19a first side portion
19b second side portion
20 firearm
21 handle
22 trigger guard
23 sight
24 barrel
25 barrel exit
26 trigger
27 picatinny rail
30 hub
31 hub visual indicator
32 hub audible alarm
35 structure
50 authorized user
51 personal electronic device
52 user audible alarm
60 unauthorized user
65 first microprocessor
70 motion sensor
75 first wireless transmitter
80 amplifier
85 touch sensor
90 power supply
95 charge controller
100 rechargeable battery
105 second microprocessor
110 second wireless transmitter

DESCRIPTION OF THE INVENTION

The best mode for carrying out the invention is presented in terms of its preferred embodiment, herein depicted within FIGS. 1 through 6. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

Referring now to FIG. 1, the invention pertains to a means to track the unauthorized use of a firearm 20. Typically, such firearms 20 are in the personal use of an authorized user 50, such as a homeowner or shopkeeper, where the firearm 20 is stored away for most of the time in a structure 50 as opposed to be carried by the authorized user 50. Such a firearm 50 can be an automatic or semi-automatic weapon like a gun, rifle, and the structure 50 is typically a house or shop. The firearm 20 has typical features, such as a handle 21, a barrel 24 and a barrel exit 25., A trigger 26 is in mechanical communication with a firing mechanism (not shown) that propels a projectile through the barrel 24 and out of the barrel exit 25. A trigger guard 22 brackets the trigger 26 and is attached to the handle 21 and bottom intermediate portion of the barrel 24. A sight 23 may be present in the upper end of the barrel 23 adjacent to the barrel exit 25. A magazine of ammunition may be removably stored in the handle 21 and in mechanical communication with the trigger 26 and firing mechanism. A picatinny rail 27 may be present on the bottom of the barrel 23 and disposed between the trigger guard 22 and the barrel exit 25. The tracker 10 is preferably attached to the picatinny rail 27 of the firearm 20 (more clearly shown and described in FIG. 3).

Figure 2:
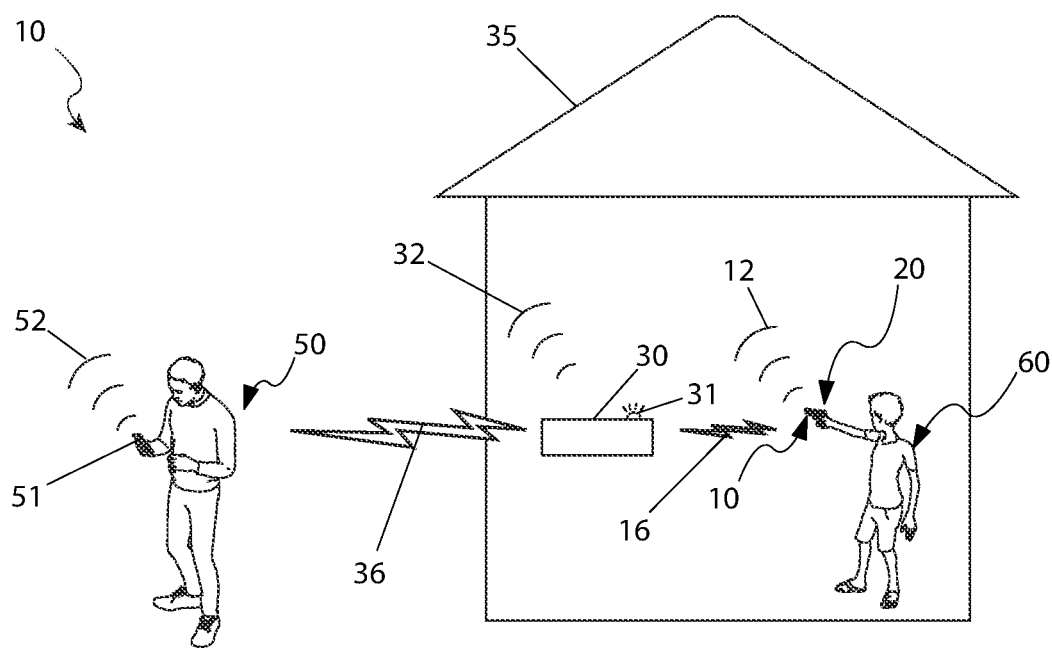
FIG. 2 is an environmental view of the tracker installed on a firearm and in use by an unauthorized person, according to the preferred embodiment of the present invention.

Referring now more closely to FIG. 2, it is shown the preferred method of use of the tracker 10. The firearm 20 has the tracker 10 installed thereon and stored or otherwise located within the structure 50. An authorized user 50 is remote form the firearm 20 with the installed tracker 20 and is in possession of a personal electronic device 51. Installed or otherwise located in the same structure 50 as the current location of the firearm 20 with the installed tracker 10 is a hub 30. In some embodiments, the hub 30 may also act as a storage compartment for the firearm 20. The hub 30 typically has a second microprocessor 105, a second wireless transmitter 110, a hub visual indicator 31, and an audible alarm 32.

When an unauthorized user 60 is in possession of the firearm 20 with the tracker 10 installed, the tracker 10 emits a device audible alarm 12 as well as generates a first distress signal 16. The tracker 10 wirelessly transmits the first distress signal 16 to the hub 30. Upon receipt of the first distress signal 16 by the second wireless transmitter 110, the second microprocessor 105 activates a hub visual indicator 31, activates the hub audible alarm 32, and generates a second distress signal 36. The second wireless transmitter 110 transmits the second distress signal 36 to the personal electronic device 51, typically carried by the authorized user 50. Upon receipt of the second distress signal 36, the personal electronic device 50 emits a user audible alarm 52 and/or provides any other alerting means capable of being produced thereby.

Figure 3:
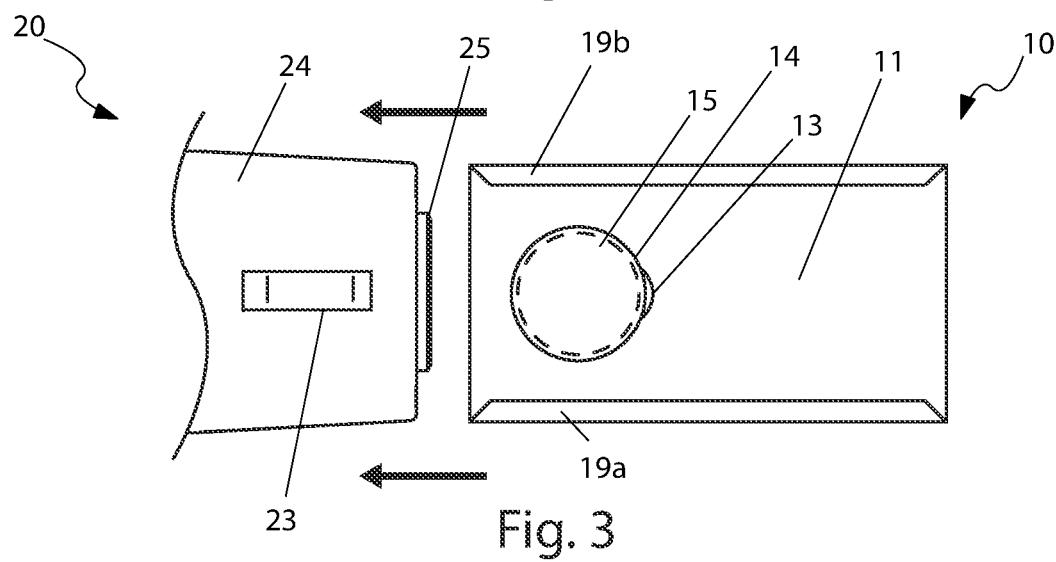
FIG. 3 is an environmental top plan view of the tracker prior to installation on a firearm, according to the preferred embodiment of the present invention.
Figure 4:
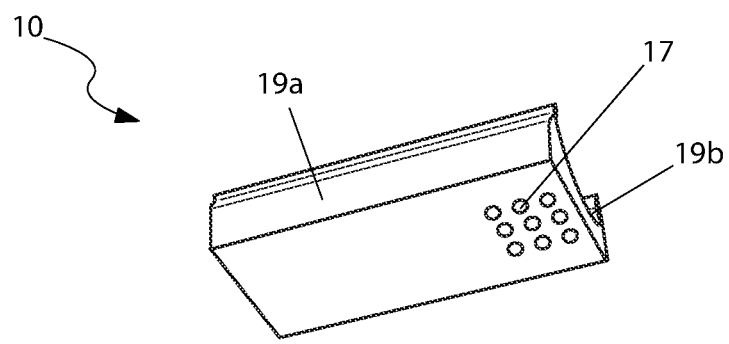
FIG. 4 is a bottom perspective view of the tracker, according to the preferred embodiment of the present invention.

Referring now more closely to FIGS. 3 and 4, it is shown that the tracker 10 is of a generally plastic construction and has generally a "U"-shaped cross-section that is capable of attaching to the picatinny rail 27 of the firearm 20 and conforming overall to the outer contour thereof. It is sized to have an overall width slightly larger than the overall width of the barrel 24 of the firearm 20 such that it does not extend too much farther.

The tracker 10 has a planar portion 11 with a length generally equal to the length of the picatinny rail 27, a first side portion 19a upstanding away from a first side thereof, and a second side portion 19b upstanding from a second side thereof. The first side portion 19a and second side portion 19b both have tapering upper terminal ends to act as a grip to enable installation and removal of the tracker 10 on the picatinny rail 27. A battery 15 is disposed within an upper (i.e., inner side) of the planar portion 11 and covered by a battery door 14. The upper surface of the battery door 14 is flush with the upper surface of the planar portion 11. Along one (1) side of the battery door 14 is a groove 13 to enable removal of the battery door 14 and replacement of the battery 15 as is necessary. Located within the tracker 10 is a first microprocessor 65 (as shown in FIG. 4), at least one (1) motion sensor 70 (as shown in FIG. 4), a first wireless transmitter 75 (as shown in FIG. 4), and an amplifier 80 (as shown in FIG. 4) in electrical communication with the battery 15. A speaker 17 is located on a bottom (i.e., the outer side) of the planar portion 11 and aligned with the amplifier 80.

When the tracker 10 is activated (e.g., inputted by an authorized user 50 via the hub 30), the microprocessor generates the first distress signal 16 when the sensors sense motion above a set threshold (e.g., movement of the tracker 10 (particularly when it is installed on the firearm 20) by an unauthorized user 60). Concurrent with the generation of the first distress signal 16, the transmitter wirelessly transmits said first distress signal 16 to the hub 30 and emits a device audible alarm 12. Upon receipt of the first distress signal 16, as mentioned above, the hub 30 generates a second distress signal 36 and transmits said second distress signal 36 to the personal electronic device 51 carried by the authorized user 50. The hub 30 also concurrently activates the hub visual indicator 31 and emits the hub audible alarm 32. Upon receipt of the second distress signal 36, as mentioned above, the personal electronic device 51 emits the user audible alarm 52 and/or any other alerting means.

Figure 5:
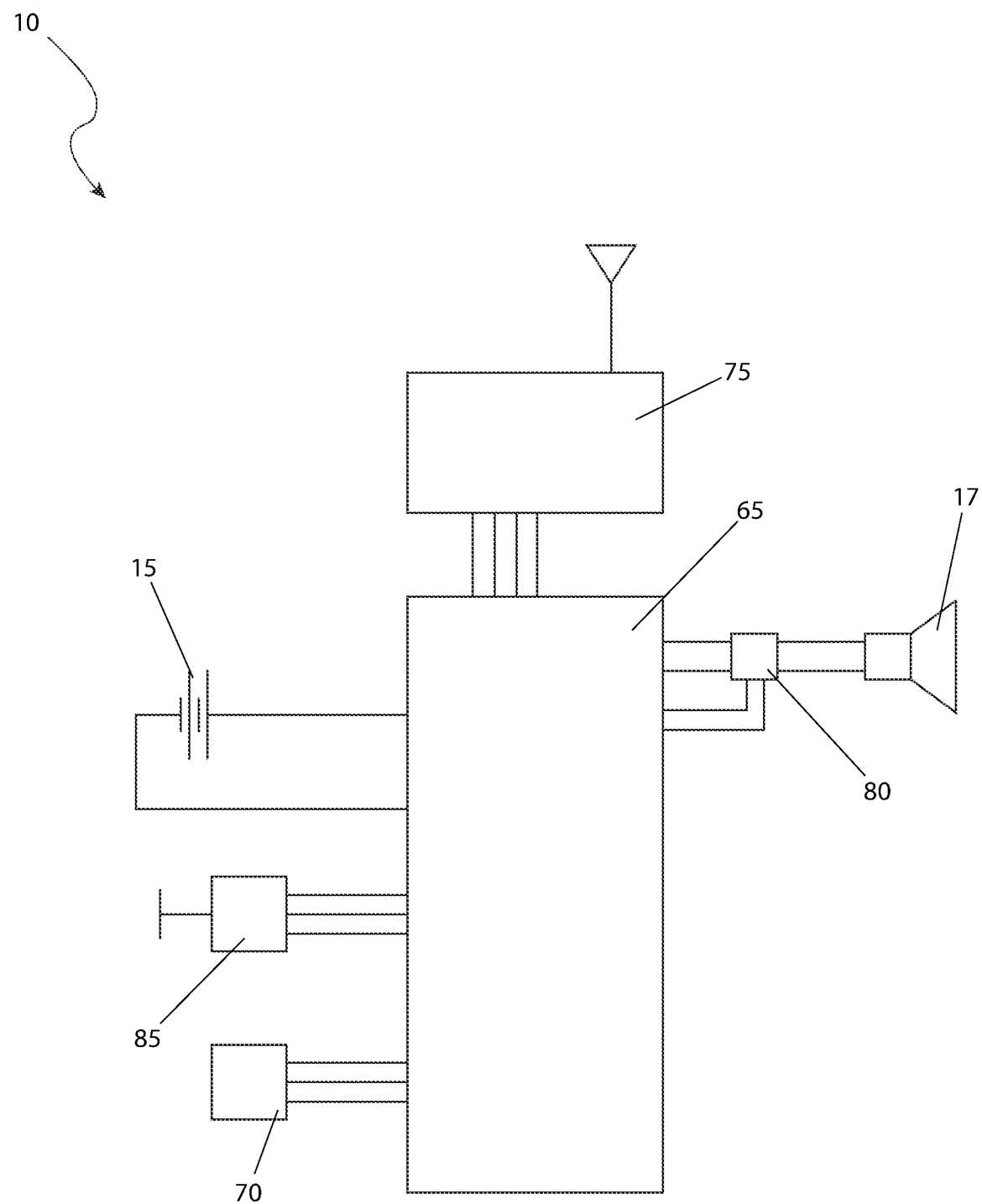
FIG. 5 is an electrical block diagram of the tracker, according to the preferred embodiment of the present invention.

Referring now to FIG. 5, an electrical block diagram of the tracker 10, according to the preferred embodiment of the present invention is depicted. Electrical power is provided by the battery 15 feeds into the first microprocessor 65. Input signals are provided by at least one (1) motion sensor 70 and possibly at least one (1) touch sensor 85 such as a capacitive touch sensor. Input and output signals are provided to the first wireless transmitter 75 and an output signal is provided to the amplifier 80 which produces the audible alert as heard by the speaker 17. It is envisioned that the first microprocessor 65 would be a Single Board Computer (SBC) such as an Arduino®, Raspberry Pi®, a stamp control module, or the like.

Figure 6:
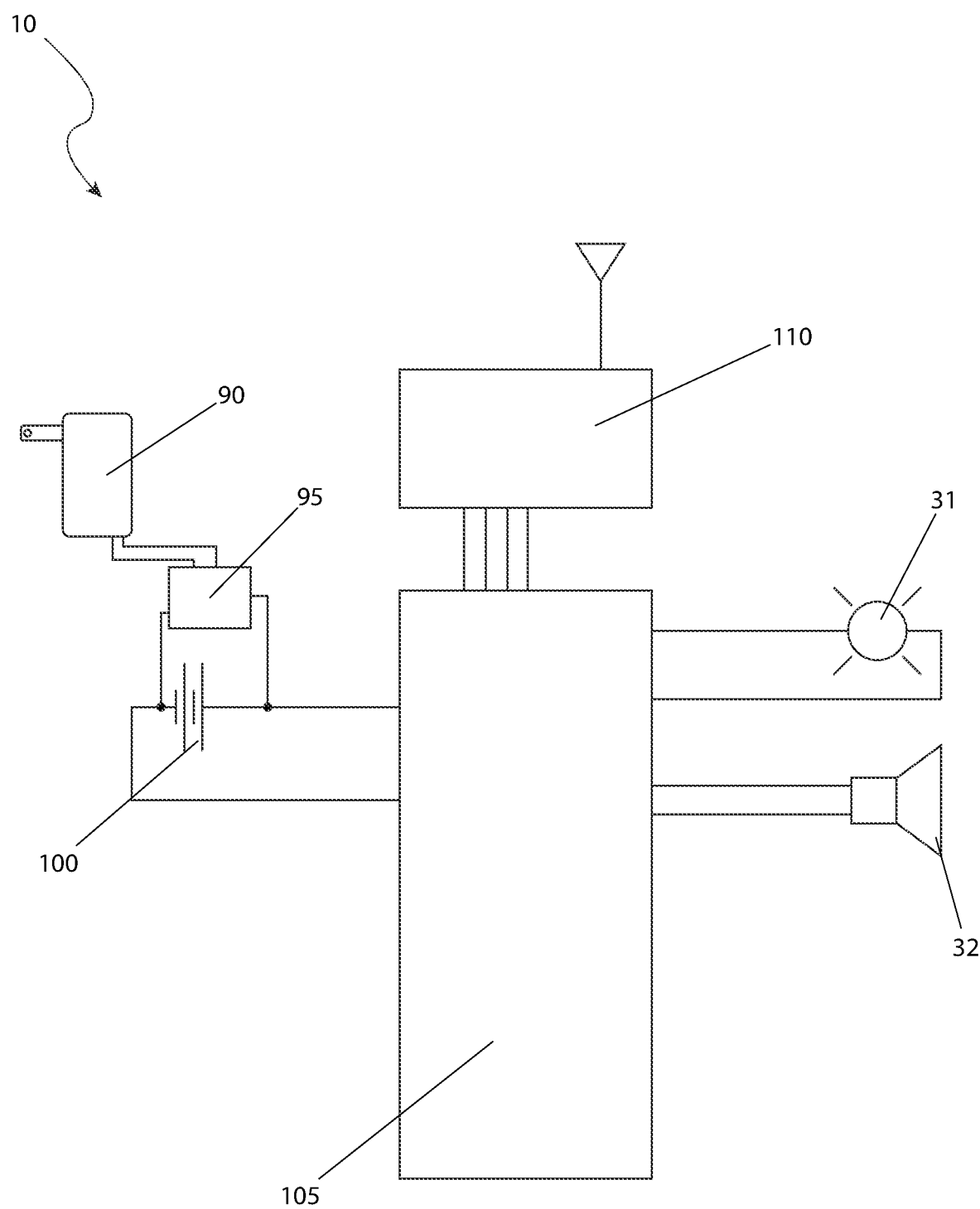
FIG. 6 is an electrical block diagram of the hub, as used with the tracker, according to the preferred embodiment of the present invention.

Referring to FIG. 6, an electrical block diagram of the hub 30, as used with the tracker 10, according to the preferred embodiment of the present invention is disclosed. Power for the hub 30 is provide by a power supply 90 which feeds a charge controller 95. The charge controller 95 ensures that a rechargeable battery 100 is charged at all times and will provide power for the hub 30 in the event of a power outage. Resultant power from the rechargeable battery 100 feeds a second microprocessor 105. Input signals to the second microprocessor 105 are provided by the second wireless transmitter 110 via the first wireless transmitter 75 (as shown in FIG. 3) and also accepts output signals for forwarding onto the personal electronic device 51 as shown in FIG. 2). Output signals from the second microprocessor 105 are sent to the hub visual indicator 31 and the hub audible indicator 32. It is envisioned that the second microprocessor 105 would be a Single Board Computer (SBC) such as an Arduino®, Raspberry Pi®, a stamp control module, or the like. Certain other embodiments may be present in the use of the invention, such as the use of a common household item as the hub 30, like a virtual assistant or home automation system. Other embodiments include utilizing the tracker 10 to perform other services, like deactivating the firing mechanism of the firearm 20 with which it is attached or alerting a local law enforcement department.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A firearm tracker, comprising:
   a planar portion adapted to having a length;
   a first side portion upstanding away from a first side of the planar portion;
   a second side portion upstanding from a second side of the planar portion;
   a hub adapted to be installed in a structure, the structure containing a firearm, the hub includes a second microprocessor, a second wireless transmitter, a hub visual indicator, and an audible alarm;
   a personal electronic device adapted to be possessed by an authorized user, the personal electronic device is in electrical communication with the hub;
   a device audible alarm emitting a first distress signal to the hub when an unauthorized user is in possession of the firearm;
   a battery disposed within an upper of the planar portion, the battery is covered by a battery door;
   a first microprocessor, at least one motion sensor, a first wireless transmitter, and an amplifier in electrical communication with the battery; and
   a speaker disposed on a bottom of the planar portion and is aligned with the amplifier.

2. The firearm tracker, according to claim 1, wherein the first side portion and the second side portion both have tapering upper terminal ends to act as a grip to enable installation and removal of the firearm tracker on a picatinny rail.

3. The firearm tracker, according to claim 1, wherein the hub is adapted to be a storage compartment for the firearm.

4. The firearm tracker, according to claim 1, wherein the second wireless transmitter transmits the second distress signal to the personal electronic device adapted to be carried by the authorized user.

5. The firearm tracker, according to claim 1, wherein upon receipt of the second distress signal, the personal electronic device emits a user audible alarm and/or an alert.

6. The firearm tracker, according to claim 1, wherein upon receipt of the first distress signal by the second wireless transmitter, the second microprocessor activates a hub visual indicator, activates the hub audible alarm, and generates a second distress signal.

7. The firearm tracker, according to claim 1, wherein an upper surface of the battery door is flush with an upper surface of the planar portion.

8. The firearm tracker, according to claim 1, wherein along one side of the battery door is a groove to enable removal of the battery door and replacement of the battery.

9. The firearm tracker, according to claim 1, wherein electrical power is provided by the battery feeds into the first microprocessor.

10. The firearm tracker, according to claim 1, wherein the first microprocessor, the at least one motion sensor, the first wireless transmitter, and the amplifier are disposed within the firearm tracker.

11. The firearm tracker, according to claim 1, wherein the first microprocessor is a single board computer selected from the group consisting of an Arduino®, a Raspberry Pi®, or a stamp control module.

12. The firearm tracker, according to claim 1, wherein the input signals are provided by at least one touch sensor.

13. The firearm tracker, according to claim 12, wherein the at least one touch sensor is a capacitive touch sensor.

14. The firearm tracker, according to claim 1, wherein the input signals and the output signals are provided to the first wireless transmitter and an output signal is provided to the amplifier which produces the audible alert as heard by the speaker.

15. The firearm tracker, according to claim 1, wherein the firearm tracker is attached to the picatinny rail of the firearm.

16. The firearm tracker, according to claim 1, wherein the firearm tracker is sized to have an overall width slightly larger than an overall width of a barrel of the firearm.

17. The firearm tracker, according to claim 1, wherein the firearm is a weapon selected from the group consisting of an automatic weapon, a semi-automatic weapon, a gun, or a rifle.

18. The firearm tracker, according to claim 1, wherein the firearm tracker is made of plastic.

* * * * *